R. JAFFÉ.
PROCESS FOR EFFECTING THE SEPARATION OF MATERIALS.
APPLICATION FILED MAR. 16, 1912.

1,109,529.

Patented Sept. 1, 1914.

Witnesses

Inventor
Richard Jaffé
by Foster Freeman Watson Hart
Attorneys

UNITED STATES PATENT OFFICE.

RICHARD JAFFÉ, OF FRANKFORT-ON-THE-MAIN, GERMANY.

PROCESS FOR EFFECTING THE SEPARATION OF MATERIALS.

1,109,529.  Specification of Letters Patent.  Patented Sept. 1, 1914.

Application filed March 16, 1912. Serial No. 684,335.

*To all whom it may concern:*

Be it known that I, RICHARD JAFFÉ, a subject of the German Emperor, and resident of Frankfort-on-the-Main, Germany, have invented certain new and useful Improvements in Processes for Effecting the Separation of Materials, of which the following is a specification.

My invention has for its object to effect the separation of materials in an improved manner, and consists in causing the materials to penetrate through a pervious layer floating on a liquid, the said layer consisting for example of a foam, emulsion, another liquid, or the like. The various grains or particles of the materials to be separated, require a greater or lesser time to penetrate through the layer, according to their size, specific weight, and other properties such, for instance, as their capacity for becoming wetted, the character of their surfaces, their cleavage, and the like, and therefore the different constituents fall after various intervals of time into the liquid on which the layer floats, and settle at definite parts of the bottom in the required separated condition and can then be removed.

The process can be carried out for instance by causing the materials to be dressed and supplied from a charging device to penetrate through a layer of soap lather floating on water, the layer of lather being in motion, while the lower liquid which supports the layer of lather is at rest.

In the accompanying drawing, there is illustrated more or less conventionally a portion of an apparatus adapted to carry out the improved process, referring to which—

Figure 1:
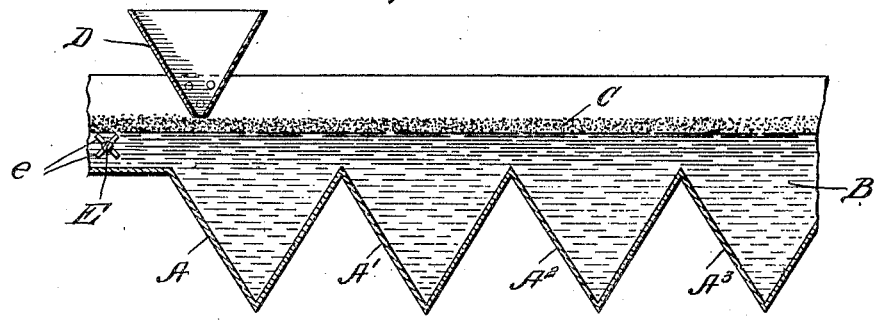
Figure 2:
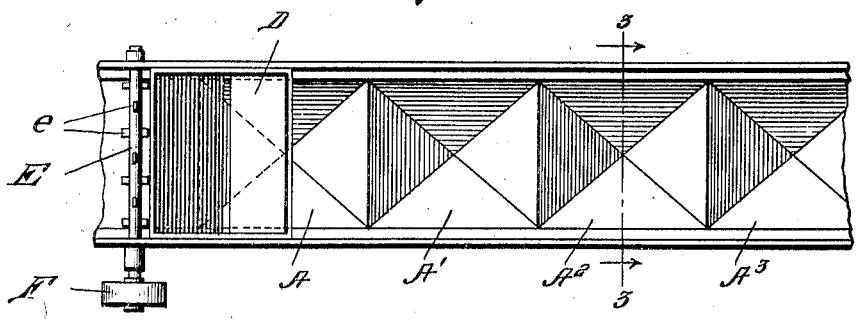
Figure 3:
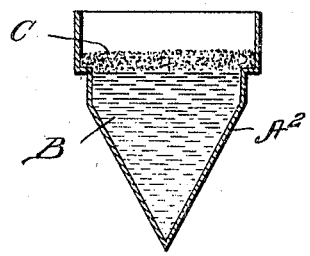

Figure 1 is a vertical sectional view; Fig. 2 is a plan view; Fig. 3 is a transverse section on the line 3—3 of Fig. 2.

Referring to the drawing, it will be seen that the apparatus includes a trough-like body provided at the bottom with a plurality of pockets A, A', A², A³, in which trough are arranged two superposed bodies of liquid, for example, a lower body B of water and an upper body or layer C of soap lather. A feeding hopper D is arranged to deliver the material to be treated upon the upper surface of the upper liquid layer or body C and the latter is caused to move beneath the hopper D by suitable means as for example by a shaft E journaled in opposite walls of the trough and provided with blades $e$ and a driving device F.

As previously explained the desired separation is effected by the time that is required for the various constituents of the mixed mass being treated to pass through the upper liquid layer C and said different substances will be therefore collected at different points in the lower liquid body B and the pockets A—A³. The floating layer, or the lower liquid, supporting it, or both of them, should be in rest or in motion, either with the equal velocities, or with different velocities, in one and the same or in opposite direction.

What I claim is—

1. The herein described method of separating the constituents of a mixed mass of finely divided material, comprising depositing material to be separated upon the upper of a plurality of superposed bodies of liquid differing in specific gravity, and both of less specific gravity than the constituents to be separated, while maintaining relative movement between said upper liquid body and the stream of material in a direction transverse to that in which the stream of material moves, the separation being effected by the passage of the material through the upper liquid as set forth.

2. The herein described method of separating the constituents of a mixed mass of finely divided material, comprising depositing material to be separated upon the upper of a plurality of superposed bodies of liquid differing in specific gravity, and both of less specific gravity than the constituents to be separated, while maintaining relative movement between said upper liquid body and both the stream of material and the lower liquid.

3. The herein described method of separating the constituents of a mixed mass of finely divided material, comprising depositing the material to be separated upon a lather-like layer supported by a liquid body while causing said lather-like layer to move relative to the stream of material and to the supporting liquid, all of said material passing through the lather-like layer and being separated during such passage and deposited in the lower liquid body at different points, as set forth.

4. The herein described method of separating the constituents of a mixed mass of finely divided material, comprising depositing the material to be separated upon a liquid body composed of a lower layer of water and an upper floating layer of the character described, all of the material passing through said upper layer and being separated during such passage so that the constituents thereof will be deposited at different points in the body of water.

In testimony whereof I have signed my name to this specification in the presence of two subscribing witnesses.

RICHARD JAFFÉ.

Witnesses:
FRANZ HASSLACHER,
ERWIN DIPPEL.